United States Patent Office 2,949,594
Patented Aug. 16, 1960

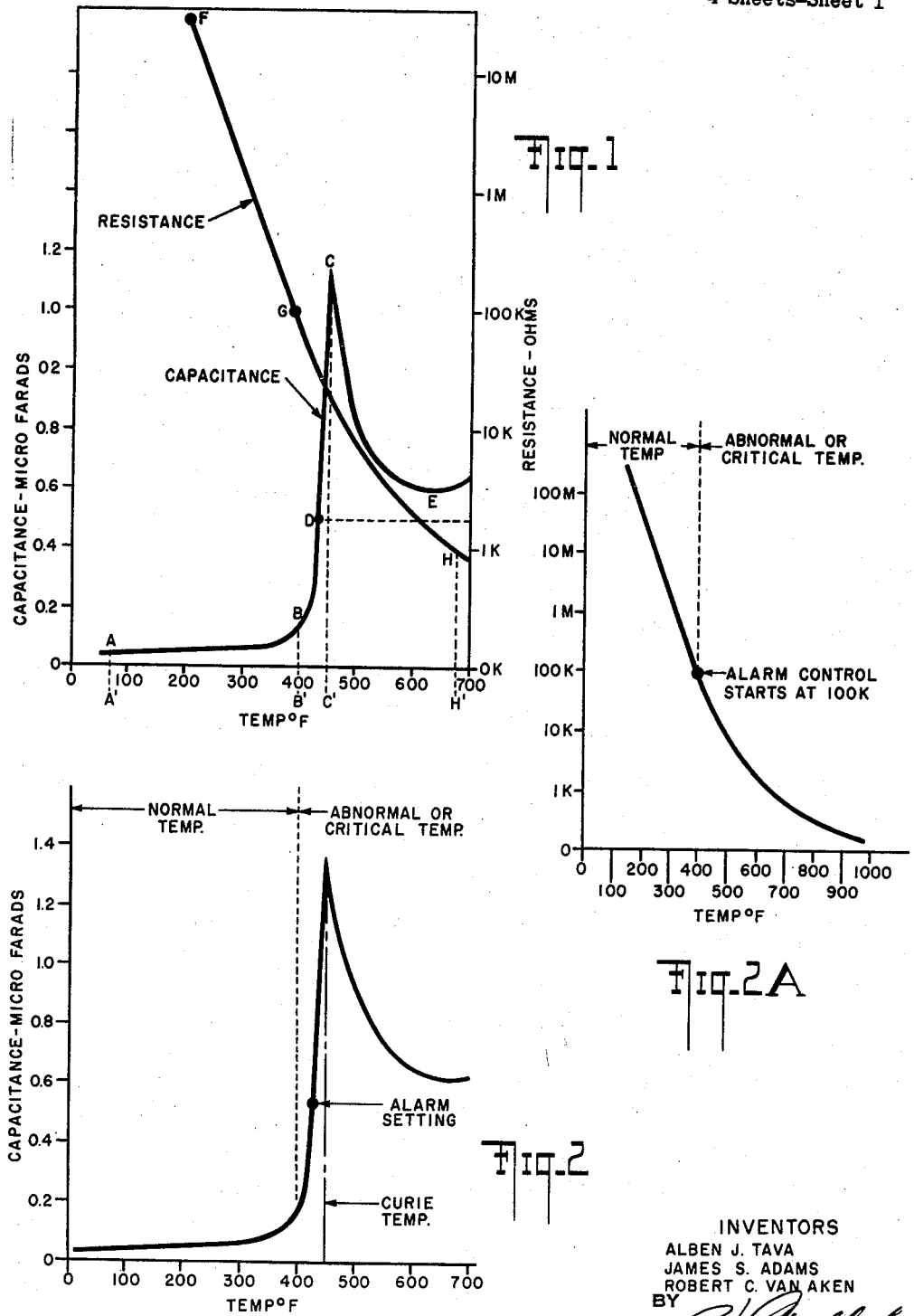

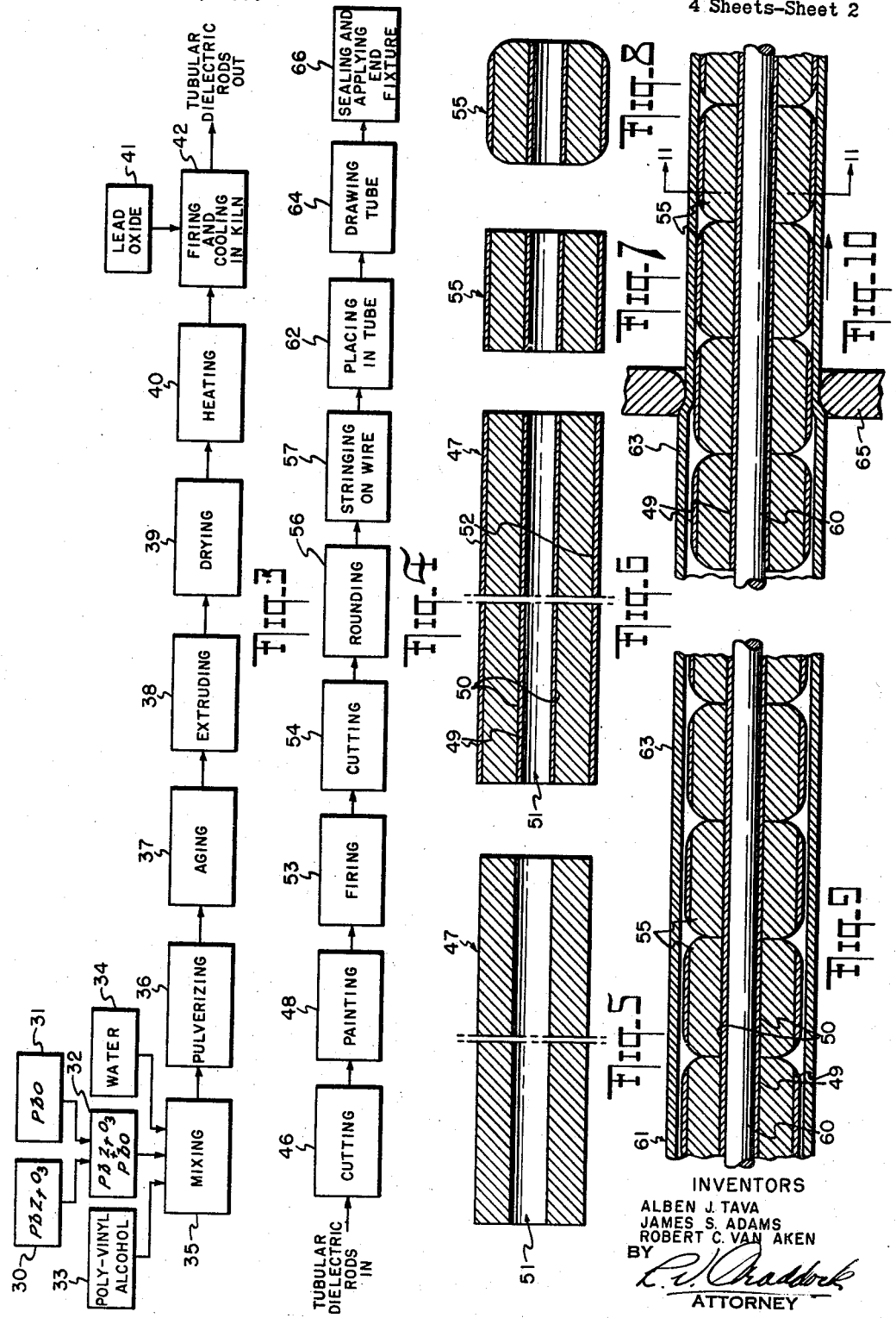

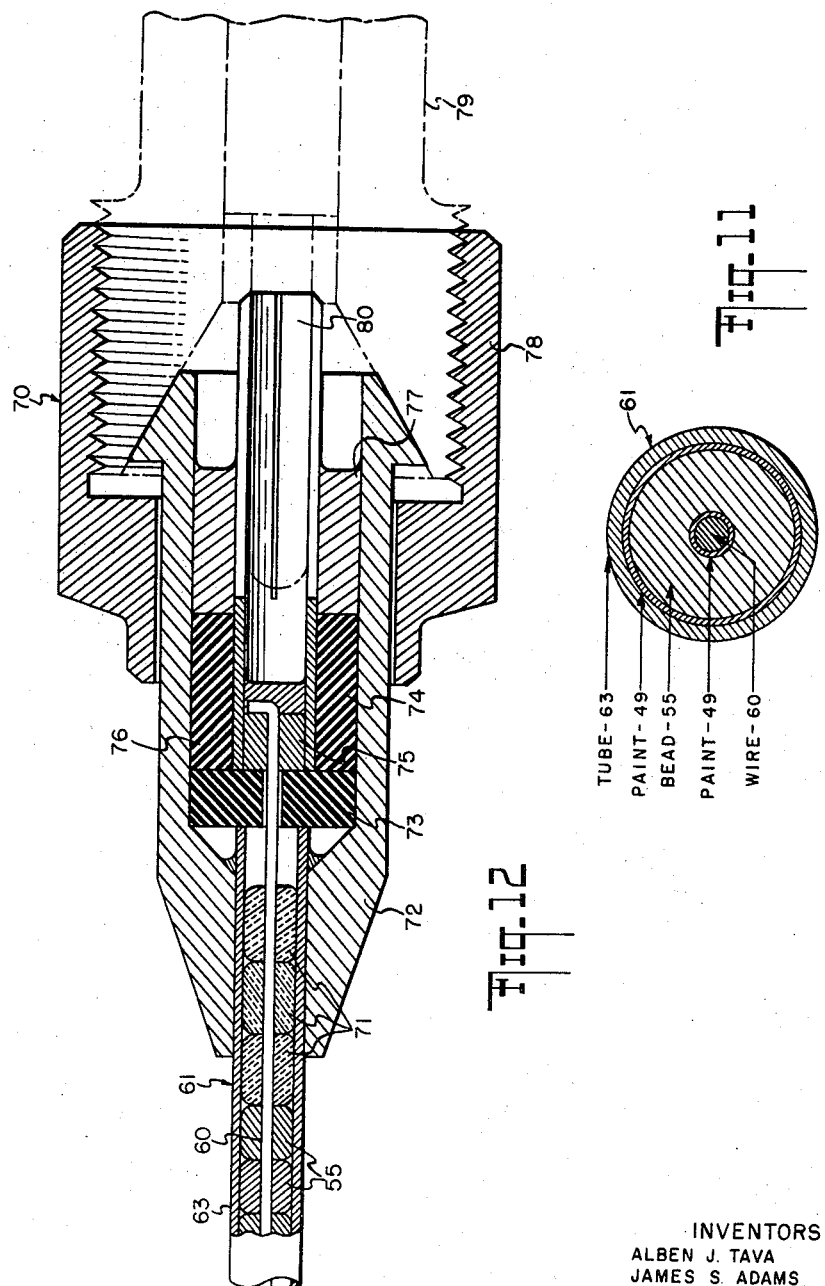

2,949,594

ELECTRIC TEMPERATURE DETECTOR

Alben J. Tava, Hicksville, James S. Adams, Great Neck, and Robert C. Van Aken, Albertson, N.Y., assignors to Sperry Rand Corporation, Great Neck, N.Y., a corporation of Delaware Filed Oct. 1, 1956, Ser. No. 613,197

14 Claims. (Cl. 338—26)

This invention relates to an electrical means for detecting and/or measuring temperature conditions and more particularly to a temperature responsive means for sensing one or more temperature conditions alternatively, sequentially and/or simultaneously. Even more particularly, it relates to the temperature responsive element, the compositions and methods of making the same; the temperature sensing component, the structure and methods of making the component; and the temperature responsive system therefor. The invention is especially adapted for use in aircraft temperature detection but is not necessarily limited thereto as it has wide application in other temperature detection and/or measuring environments.

Prior art temperature responsive systems have several inherent limitations. The sensitive element has had only one parameter which varies with temperature. The sensitive element could not be used to cover as wide a range of operating temperatures as the element of the present invention. Excessively low resistance values of the sensitive element have limited the operating range and there has been ambiguity of alarm signals.

It is an object therefore of the present invention to provide an electrical means for detecting and/or measuring one or more temperature conditions alternatively, sequentially and/or simultaneously.

It is another object of the present invention to provide a temperature responsive system operable over a wide range of temperature conditions.

It is a further object of the present invention to prevent ambiguous alarm signals.

Another object of the present invention is to minimize the effects of varying ambient conditions over the length of the sensing component.

A further object of the present invention is to provide a system which can use a longer sensing component over a wider temperature range.

It is another object of the present invention to provide practical and economical methods of manufacturing the element and components of the system.

A dielectric sensitive element for puropses of the description of the present invention is defined as a material in which the electric characteristics of capacitance and resistance are non-linear functions of temperature whereby the dielectric constant increases with rising temperature while the ohmic resistance decreases with rising temperature. Preferably, the capacitance characteristic is substantially constant over a relatively wide first temperature range and changes abruptly over a very limited second temperature range. The resistance characteristic, preferably, is relatively high over the first and second temperature ranges dropping to a relatively low but measurable value over a third temperature range. The above characteristics are found in several materials particularly those known as ferroelectrics and anti-ferroelectrics. For purposes of this description henceforth when the word ferroelectric is used, it is intended to include anti-ferroelectrics since the electrical characteristics which are utilized in the present invention are common to both ferroelectrics and anti-ferroelectrics. Preferably, but not necessarily, the dielectric sensitive element is in the form of a ceramic in order that it does not undergo irreversible changes which would cause the electrical properties thereof to be altered upon repeated exposures to the upper limit of its operating range. It is to be understood that the first, second and third temperature ranges mentioned above, are not necessarily in their respective order of increasing temperature.

For purposes of the description of the present invention the term "normal temperature" is the normal operating ambient temperature of the area and is below the abnormal temperature. The "abnormal temperature" is higher than the normal operating temperature of the area and is indicative of an overheat condition that lies above the normal temperature and below the critical temperature. The "critical temperature" is above the abnormal temperature of the area or is a flame temperature that is indicative of a fire condition in the area or at a particular point.

In particular, the invention resides in a system having a sensing component responsive to at least one temperature condition wherein the sensing component comprises a bendable cable formed of two electrodes with a dielectric sensitive element contiguous to said electrodes. When utilizing lead zirconate, for example, as the dielectric sensitive element, the capacitance characteristic may be utilized to indicate abnormal temperature conditions while the resistance characteristic may be utilized to indicate critical temperature conditions thus providing a two signal temperature responsive system. A one signal system may be provided by utilizing the resistance or capacitance parameter only. The temperature responsive cable associated with electrical circuitry forms a temperature responsive system in accordance with the objects of the invention. Various other objects, advantages and features of the present invention will become apparent from the following detailed description taken in conjunction with the accompanying drawings, wherein like reference characters indicate like elements, in which:

Fig. 1 shows typical curves of the resistance and capacitance characteristic versus temperature for a lead zirconate dielectric sensitive element twenty-five feet in length constructed in accordance with the present invention for a two signal system;

Fig. 2 is a typical curve of the capacitance versus temperature for a similar lead zirconate element constructed in accordance with the present invention for a one signal system;

Fig. 2A is a typical curve of the resistance versus temperature for a similar lead zirconate element constructed in accordance with the present invention for a one signal system;

Fig. 3 is a schematic diagram of the process for manufacturing a lead zirconate and lead oxide dielectric sensitive element in accordance with the present invention;

Fig. 4 is a schematic diagram of the process for manufacturing a temperature responsive cable in accordance with the present invention;

Figure 13:
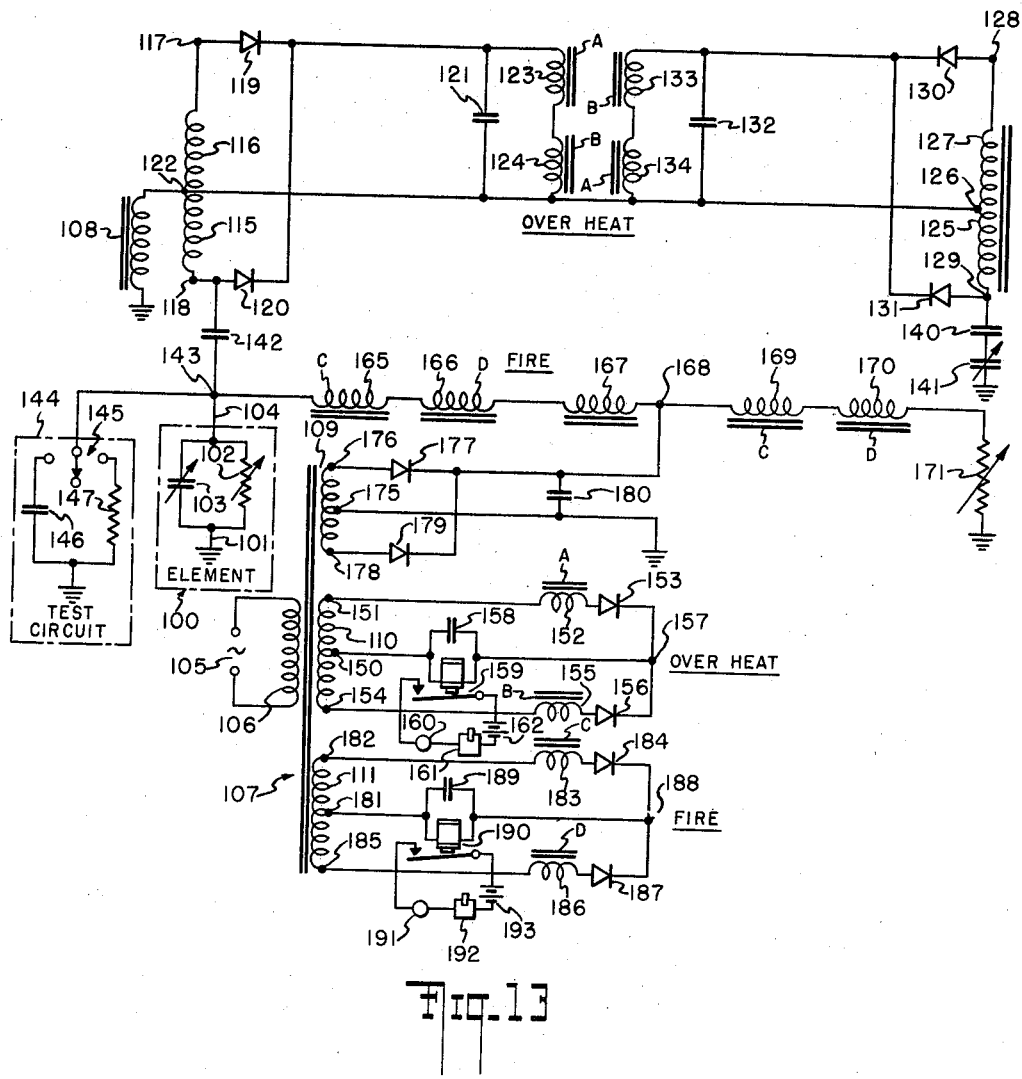

Figs. 5–10 inclusive are enlarged longitudinal sectional views of the cable in various stages of the process of Fig. 4;

Fig. 11 is an enlarged cross-sectional view of the cable of Fig. 10 taken along line 11—11;

Fig. 12 is an enlarged longitudinal sectional view of a typical end connector attached to the cable; and Fig. 13 is a schematic drawing of a novel electrical temperature responsive circuit utilizing the dielectric element of the present invention.

In accordance with the present invention, one of a number of dielectric sensitive element which have suitable electrical characteristics previously described are suitable for application in a temperature responsive system. The use of a particular dielectric sensitive element is determined by the Curie point of the dielectric sensitive compound and the temperature or the temperature range over which it is intended to be used. By way of a preferred illustration, the invention is particularly described with relation to lead zirconate as the dielectric sensitive element but it is to be understood that no unnecessary limitations of the present invention to this material is intended.

The following is a representative list of compounds which may be utilized as dielectric sensitive elements in temperature responsive systems that appear to be particularly suitable based on available data including Curie point information.

| Compound: | Curie point, °C. |
|---|---|
| Barium titanate | 130 |
| Lead hafnate | 215 |
| Lead zirconate | 231 |
| Rubidium tantalate | 247 |
| Sodium niobate | 330–355 |
| Potassium niobate | 434 |
| Lithium tantalate | 450 |
| Sodium tantalate | 475 |
| Lead titanate | 490 |

The following is an additional list of compounds which appear to be suitable for lower temperature application based on available data including Curie point information.

| Compound: | Curie point, °C. |
|---|---|
| Cadmium niobate, $Cd_2Nb_2O_7$ | −88, −103 |
| Potassium tantalate | −260 |

It is probable that the following compounds may also be suitable for temperature detection purposes because their crystallographic characteristics indicate they are ferroelectric although their specific electrical characteristics are not known at present.

| Compound: | Curie point, °C. |
|---|---|
| Lithium niobate | |
| Strontium hafnate | |
| Barium hafnate | |
| Tungsten oxide | |
| Sodium vanadate | |
| Lanthanum aluminate | |
| Lead niobate | −258 |
| Strontium titanate | −273 |

Shifting of the Curie point temperature with a change in dielectric variations can be accomplished by mixtures of the materials. This may be accomplished by compounding together ceramic powders of two different ferroelectric materials or by compounding a non-ferroelectric material with a ferroelectric material. In the titanate group, for example, mixtures of barium and strontium titanate can be affected. In the zirconate group, solid solutions of lead and barium zirconate achieve analogous results. In the niobate group, mixtures of cadmium and sodium niobates give similar results. In such a manner, not only may the Curie temperature be shifted, but the manner in which the resistance and the dielectric constant vary with temperature may be altered. Two cases of temperature shifting may be cited: (a) The Curie temperature of lead zirconate may be shifted upwards in a uniform manner by the addition of lead titanate. In this way Curie temperatures of 231 to 490° C. may be obtained. (b) The Curie temperature of potassium niobate (435°) may be depressed approximately 7° C. for each mole percent of potassium tantalate added. Changes in the electrical characteristics of the dielectric sensitive elements may also be accomplished by mixtures of materials such as lead oxide being mixed with lead zirconate which will be more fully described later.

For use in an aircraft temperature responsive system, a dielectric sensitive element comprising lead zirconate is particularly advantageous since it has its Curie point at 231° C. (448° F.) which is the approximate abnormal temperature where overheat detection is desired with the cable of the sensing component becoming operative to give an alarm signal at approximately 425° F. which will now be described.

Referring now to Fig. 1 the capacitance and D.C. resistance characteristics versus temperature for a typical two signal system are plotted for a lead zirconate dielectric sensitive element having a length of twenty-five feet. Referring to the capacitance curve, the temperature zone from A′ to B′ is considered a normal temperature zone. In this temperature zone it is desirable that there be little or no change in capacitance characteristic with increasing temperature from A to B. By maintaining a substantially constant capacitance characteristic from A to B, variations of the normal or ambient temperature within the range A′ to B′ will not affect the capacitance signal. Therefore, the only parameter affecting the signal level of the normal temperature zone A′ to B′ is the length of the sensing dielectric sensitive element.

An abrupt change in the capacitance characteristic from B to C results in an abrupt change in capacitance signal level resulting from this characteristic. This abrupt change occurs over a narrow temperature band which may be referred to as an abnormal or overheat temperature range in a two signal system. This abrupt change in capacitance characteristic occurs over a fixed temperature from B′ to C′ and point C′ is referred to as the Curie point which for lead zirconate is 448° F. (231° C.). The greater the change in the capacitance ratio from B to C, the sharper the curve becomes. The abrupt change in capacitance signal level is thus readily detectable. Since repeated heatings above the Curie point have no effect on changing the Curie point temperature, this point may be used as a positive reference temperature. It can be seen that a dielectric sensitive element having this characteristic is independent of normal temperature variations and signal response in a utilizing circuit where signal amplitude is a function of capacity, is dependent entirely on the sharp characteristic which occurs within a very limited temperature range.

Preferably, the alarm temperature is set on the rising slope of the capacitance characteristic curve for example point D to preclude any possibility of ambiguity or "drop-out" as a result of the lower capacitance characteristic at the higher temperatures such as point E. Point E denotes the minimum drop from the Curie point which is within the temperature range above the abnormal range. Under certain conditions point C may be utilized as the alarm point or points may be selected on the capacitance curve on either side of the Curie point C for particular applications.

As described previously, additives to the dielectric sensitive element may vary the capacitance ratio and provide a marked improvement in the capacitive change over the range from B to C. For example, additions of lead oxide to lead zirconate improve the capacitance ratio by approximately 40% in certain cases to be described. This is advantageous as the greater the change from B to C, the easier it is to detect this change.

Reference is now made to the resistance characteristic curve of Fig. 1 for lead zirconate. When utilizing a two signal system, the second parameter to be used is generally the resistance characteristic of the dielectric sensitive element. It is to be understood however, that this is not mandatory and in certain systems the capacitance characteristic may be used to indicate the higher temperature range while the resistance characteristic is used to indicate a lower temperaure range or they may be used individually to indicate either temperature range.

Throughout the normal and abnormal temperature ranges A' to B' to C', the D.C. resistance characteristic F to G is of such magnitude that with the operating voltage used in the system there is no detectable D.C. signal change of the aforementioned temperature ranges. When the temperature continues above the abnormal temperature range B' to C' to a critical temperature range from C' to H', the resistance characteristic has a slope that permits conversion of resistance values to temperature. Thus by knowing the slope of the resistance characteristic curve, a signal level which is a function of resistance can be selected at any particular critical temperature. The resistance characteristic preferably is relatively high over the normal and abnormal temperature ranges and drops to a relatively low but measurable value over the critical temperature range. The primary advantage of the two parameter system is that one parameter such as capacitance can be used for one temperature range and alternatively, sequentially and/or simultaneously the other parameter such as resistance can be used for a different temperature range.

The resistance characteristic of the present invention is particularly useful because of its high resistance values which permits operating the sensing component at elevated ambient temperatures and still has sufficient resistance variations to detect even higher temperature exposures. Further, with this type of characteristic, longer lengths of the sensing component can be utilized with only slight reduction in the ambient range and no sacrifice in the detection of high temperature exposures. Thus, for example, a sensing component 15 feet long could be subjected to ambient temperatures up to 850° F. and still have sufficient variations in resistance to detect temperatures above 850° F. over a limited portion of the component. Assuming the same resistance values and doubling the length of the sensing component to 30 feet, the component could be subjected to ambient temperatures up to 800° F. and still have sufficient variations in resistance to detect temperatures above 800° F. as above, thereby providing a considerably longer length of sensing component operative over a considerably greater temperature range than previously known.

Fig. 2 is a characteristic curve of the capacitance versus temperature for lead zirconate using a sensing component 25 feet in length. This curve indicates how capacitance alone can be used as the sensing parameter such as in a single signal system. In this application, the desired normal temperature range is known and the abnormal or critical temperature range as the case may be is also known. On this basis, one of the materials listed above could be substituted for the lead zirconate to give the sharp characteristic change in the Curie point in the temperature zone where the alarm is desired thereby effectively increasing or descreasing the normal temperature range. For lead zirconate, the sharp change occurs only at the Curie point temperature at 448° and the resultant change in capacitance gives a positive alarm signal at, say, the alarm setting as shown. No other combination of temperatures can give this signal. This is not true of known prior art systems where the alarm setting can be reached by exposing a short section of the sensing component to a high temperature or a long length of sensing component to a lower temperature thereby providing ambiguous alarm signals.

Fig. 2A is a resistance characteristic curve showing how resistance alone can be used as the sensing parameter such as in a one signal system. The curve is plotted on the basis of using a 25 foot sensing component of lead zirconate. Note that on a logarithmic scale, the resistance characteristic appears linear but in reality it is not linear. By selecting a material from the above group, a value of resistance may be obtained which is extremely high over the normal ambient temperature range and which decreases as the temperature range is approached where detection is desired. The control unit can be set at a predetermined value to detect the predetermined resistance of the dielectric sensitive element and when it drops to this value with increasing temperature an alarm will be given. For example, temperatures at any resistance level below 100K and preferably above 50 ohms can be used for alarm purposes. Thus, the dielectric sensitive element can be operated with the sensing component at 400° F., 600° F. or 800° F. and there is a still higher range over which to make an alarm adjustment.

In terms of the electrical resistance characteristics of the sensing component, it can be considered that the resistances of the dielectric sensitive elements are in parallel throughout the length of the sensing component. Therefore, as the length of the sensitive component is increased the total resistance thereof decreases but is still at such a high resistance level that longer lengths of sensing component can be operated at higher ambient temperatures than previously known.

Referring now to Fig. 3 of the drawings, the dielectric sensitive element may be prepared by using a technical or other suitable grade of lead zirconate powder 30 preferably containing between 2% and 5% of lead oxide 31 by weight in excess of the stoichiometric amount of lead zirconate required. The stoichiometric quantity of lead oxide and zirconium dioxide required to make lead zirconate amounts to 64.4 and 35.6 mols, respectively. A convenient way to prepare the powder is to react zirconium dioxide with an excess of lead monoxide. A two to five percent excess of lead monoxide beyond the stoichiometric amount required for the formation of lead zirconate has been found to be beneficial to the electrical properties thereof as will be hereinafter described. The operations involved in the preparation of the powder include the mechanical blending of the dry oxides, reaction at elevated temperature and grinding. The powder is obtainable from the Titanium Alloy Corporation. The particle size of the powder should be less than 10 microns in diameter and preferably between ½ and 3 microns for satisfactory extrusion. The non-plastic ceramic mixture 32 is transformed into a plastic body in order to perform a satisfactory extrusion by the addition of a suitable plasticizing agent. The plasticizing agent should not react with the mixture 32 and should be capable of being driven off by heat or other means without the formation of compounds which are deleterious to the electrical properties of the dielectric sensitive element. Polyvinyl alcohol 33 (Du Pont Elvanol grade 52–22) in conjunction with water 34 has been found suitable for the extrusion of the ceramic body comprising lead zirconate and lead oxide. The amount of polyvinyl alcohol required is a function of the intrinsic plasticity of the ceramic powder. Du Pont Elvanol grade 52–22 is a polyvinyl alcohol 86–89% hydrolysed giving a viscosity in a 4% aqueous solution at 20° C. of 19–25 centipoises. When using a technical grade of lead zirconate and lead oxide powder described above, the amount of polyvinyl alcohol that is added as a plasticizer may be in the ratio of 100 parts of mixture to 1 part of polyvinyl alcohol and a range of .5% to 10% of polyvinyl alcohol by weight of mixture has been found suitable. Sufficient water is added to produce the desired degree of plasticity and preferably the amount of water added may vary between 5% and 10% of water by weight of ceramic powder.

The mixture comprising the ceramic powder, polyvinyl alcohol and water should be intensively blended so that each ceramic particle becomes surrounded with a gelatinous sheath. This may be accomplished by mixing or blending 35 in a suitable mixing device such as a muller-type mixer, sigma blade mixer or roller mill, the length of mixing time being regulated according to the efficiency of the particular apparatus used. A muller-type mixer mixes by the action of mulling or squeezing the material to be mixed between a wheel shaped roller and another surface. This action is repeated continuously. A sigma blade mixer is a device consisting of a chamber in which two intermeshing S-shaped arms blend the material, continuously folding and pressing it upon itself. A roller mill is similar in action to the muller-type except that it employs two or three rollers instead of one. The spacing between the rollers is adjustable to give a greater or lesser degree of squeezing. Comparing the efficiency of the three types, the roller mill is most intensive while the muller mixer the least. With a Lancaster muller-type mixer, a period of ½ to 2 hours has given good results.

After a suitable time in the mixing stage, the mixture is removed and the large masses formed in the mixer are pulverized 36 to a uniform size in a suitable device such as a hammer mill. The purpose of this operation is three-fold: first, to facilitate handling; second, to obtain uniform distribution of the moisture content; and lastly, to aid in the subsequent de-airing process. For the preferred embodiment of the process being described, pulverizing the particles to a uniform size such that they will pass through a ⅛" screen has been found satisfactory. Under certain conditions, these requirements may be accomplished in the preceding operation.

In order to assure that no inhomogeneities exist in the mass, it is placed in a hermetically sealed container and aged 37 for a sufficient time to insure uniform distribution of water and alcohol such as 18 hours; however, this is not critical. Under certain conditions, the ceramic mixture may be prepared in such a manner that no inhomogeneities exist and the aging process may not be necessary.

After aging, the ceramic mixture is formed into the desired shape, which in the preferred embodiment shown, may be an extruding process 38. The ceramic mixture is placed in a standard extrusion press and compressed under a vacuum of approximately 28 inches of mercury to obtain a body relatively free from air. The mixture is then extruded in convenient lengths in the form of a tubular dielectric rod. For example, a suitable rod may have a 4 foot length with an outside diameter of .068 inch and an inside diameter of .026 inch which is performed at the rate of 2 feet per minute with a pressure of 1200 to 2500 lbs. per square inch. The size of the die orifice is chosen according to the firing shrinkage of the particular lot of ceramic material used to obtain a body having the required dimensions. For instance, a die having an inside diameter of .068 inch would be used with a material having a shrinkage of 11% to give a final outside diameter of approximately .061 inch and an inside diameter of about .023 inch.

The extruded or formed ceramic body is dried 39 upon drying racks designed to prevent dimensional changes and to eliminate a portion of the water within the body. Suitable drying time has been found to be a period of approximately 24 hours although this is not critical. The dried ceramic body is then heated 40 to a temperature of 600° to 800° C. in an oxidizing atmosphere to drive off the remainder of the water and burn off the polyvinyl alcohol. It is important that the organic plasticizer be removed since its presence during the subsequent firing operation 42 would cause a reduction of lead oxide to metallic lead which is harmful to the desired electrical properties. This is accomplished by heating to a minimum temperature of 600° C. in a current of air. If the burning-off operation and the firing operation are accomplished in separate steps and the ceramic tubing must be handled subsequent to the burning-off operation, a temperature of 800° C. has been found to give sufficient mechanical strength. The temperature during the burning-off operation should not exceed 900° C. since above that temperature, lead oxide begins to volatilize from the body. Under certain conditions it may be desirable to perform the burning-off and the firing in a single operation, in which case it is necessary to close the firing chamber in the temperature range of 600° to 900° C. to prevent loss of lead oxide. It may also be desirable to perform the drying and heating operations as a single step in the process.

After the water and alcohol are completely eliminated, the green ceramic body is placed in a firing chamber, or kiln, of lead oxide resistant material such as platinum. Masses of lead zirconate containing an excess of lead oxide are strategically placed in the firing chamber to maintain a lead oxide atomsphere 41 within the chamber in order to prevent the loss of lead oxide vapor from the ceramic body. To accomplish this, preferably, the lead oxide enriched masses of lead zirconate contain a greater concentration of lead oxide than the concentration of lead oxide in the formed ceramic body. It is particularly important to prevent the loss of lead oxide from the formed ceramic body as this will result in a degradation of the desired electrical properties of the ceramic body and also to prevent the lead zirconate in the formed ceramic body from decomposing into lead oxide and zirconium oxide. The firing chamber is tightly closed to minimize the loss of volatile lead oxide and fired 42 to a temperature of 1000° to 1300° C. at a rate of 260° C. per hour to sinter the ceramic body. A soaking period of 1 hour at 1200° C. has been found satisfactory, but periods of from 15 mintues to 3 hours may be used depending upon the rate of heating and the soaking temperature.

One of the functions of the sintering operation is the elimination of voids from the ceramic body thus enhancing the electrical properties thereof. In particular, the density affects the dielectric constant and sintering achieves the desired density. For example, in the preferred embodiment of the system to be described, it is desirable that the aforementioned tubular dielectric rod have a capacitance of about 150 mmf. per inch. This requires firing the rod to a sufficient density, for example, 7.3 g./cc., to achieve a dielectric constant of about 100 when the rod has the previously described dimensions. It is noted that bodies having lower densities and thus lower capacitance per inch may be utilized by making certain adjustments in the system. It is further noted that the ratio of the dielectric constant a 130° C. to that at the Curie point is acceptable even in lead zirconate bodies having porosities as high as 25% by volume.

Preserving an excess of lead oxide in the ceramic body serves several purposes including enhancing the electrical properties of the body and facilitating sintering the body to the desired density at lower firing temperatures. The presence of excess lead oxide has been found to cause the ratio of the dielectric constant of lead zirconate at the Curie point to the dielectric constant at 130° C. to be increased approximately 40%. The optimum amount of excess lead oxide has been found to be in the range of 2 to 5% by weight of mixture.

After a suitable soaking period, the ceramic bodies are cooled 42 in the aforesaid atmosphere within the firing chamber to room temperature.

The excess lead oxide may be added at the beginning of the process or during the firing operation. Alternatively, therefore, the process for the preparation of the dielectric sensitive element would include the steps of mixing pure technical grade lead zirconate powder, wherein the lead zirconate powder is a stoichiometric mixture and does not contain lead oxide, with a suitable plasticizer and water. The steps in the alternative process are then the same as those described above, except in the firing stage excess lead oxide is introduced into the lead zirconate ceramic body such that the lead zirconate ceramic body absorbs preferably 2 to 5% excess lead oxide. This may be accomplished by strategically locating within the firing chamber masses of lead zirconate enriched with concentrations of lead oxide sufficiently greater than 5% that the formed lead zirconate ceramic bodies will absorb approximately 2% to 5% excess lead oxide.

Under certain conditions, the steps of drying, heating and firing may be accomplished in a single operation.

Fig. 4 indicates a method of manufacturing temperature detector cable when the end products of the process shown in Fig. 3 are dielectric sensitive elements in the form of tubular dielectric rods. The tubular rods of Fig. 3 are usually too long for convenient handling and are cut 46 into suitable shorter lengths. The shorter lengths, for example, may be approximately 4 inches long forming a short tubular dielectric rod 47 indicated in Fig. 5. The short tubular rods 47 are then painted 48 inside and out with a suitable electrically conductive paint 49, such as liquid burnish platinum paint. A platinum paint 49 which has been found satisfactory is a mixture of Glyptal resin binder and platinum particles with lead and boron fluxes that is procurable from the Hanovia Company of Newark, New Jersey, and is known as Hanovia Mixture #5255. Referring to Fig. 6, the platinum paint 49 may be applied to the interior wall 50 of the ceramic tubular rod 47 by a suction device whereby the paint is drawn up through the small center hole 51 in the rod. To insure that the center hole 51 is not clogged with paint, air is forced through the hole 51 in the ceramic rod 47 in the opposite direction forcing out the excess platinum paint 49. The exterior wall 52 of the ceramic rod 47 may be coated by dipping it into the platinum paint and withdrawing the rod at a prescribed rate to obtain a uniform coating or by brushing or spraying the paint on the rod. After painting, the ceramic rods 47 are fired 53 in a suitable firing chamber to a temperature of approximately 800° C. Firing burns off all organic materials in the paint 49 and creates an atomic bond between the paint 49 and the ceramic rod 47. The painting and firing cycle may be repeated in order to insure a suitable layer of paint 49 on each surface to form one or more layers of conductive paint bonded to the outside wall 52 and to the inside wall 50 of the ceramic rod 47. Besides forming a conductive electrode, painting the ceramic rod also serves to make it impervious to moisture.

The 4 inch lengths of painted ceramic rods may then be cut 54 into suitable shorter lengths such as 1/16 to 1/4 inch lengths as shown in Fig. 7 to form ceramic beads 55. The length of the bead 55 is dependent upon the radius about which the fire detector cable is to be bent; the shorter the bead length, the smaller bend radius permissible of the sensing element. The ends of the ceramic beads 55 may be rounded 56 as seen in Fig. 8 for easier bending of the temperature detector cable to be described.

After rounding, the ceramic beads are strung 57 onto a wire 60, preferably Inconel, or other suitable conductor. Inconel is desirable because of its oxidation and corrosion resistance at high temperatures. In the preferred embodiment shown in Fig. 9, the Inconel wire has a diameter of .020 inch which is approximately the inside diameter of the ceramic beads 55 after painting. This provides a tight fit of the platinum paint 49 on the inner wall 50 of the bead 55 to the wire 60 achieving good electrical contact between the wire 60 and the paint 49. Sufficient beads 55 are placed on the wire 60 to form the desired length of fire detector cable 61. The strung beads 55 are then placed 62 in a fully annealed Inconel tube or other suitable conducting material or sheath 63. Preferably, the wire 60 and beads 55 are coaxially aligned within the tube 63. As shown in Fig. 9, the tube 63 has an .083" O.D. with a .010" wall thickness providing a loose fit between the exterior wall 52 of the beads 55 and the tube 63. The tube 63 is then cold drawn 64 through a series of dies 65 as indicated in Fig. 10 until an intimate contact is obtained between the inside diameter of tube 63 and the platinum paint 49 on the exterior wall 52 of the ceramic beads 55.

Under certain conditions, the steps of cutting and rounding may be combined by using a suitably shaped cutting wheel or abrasive air stream that would simultaneously cut and round the edges of the beads. Alternately, the 4 inch ceramic rod may be peripherally notched at predetermined intervals, every 1/8 inch, for example. The notched 4 inch rod may then be strung on the wire 60 and broken into beads 55 prior to placing in the tube 63. The notched rod could also be strung on the wire 60 in one piece, placed in the tube 63 and broken into smaller sections at the time of installation when bending the temperature detector cable 61 to meet the particular installation requirements.

A cross section of the temperature detector cable 61 after being drawn 64 is shown in Fig. 11. The wire 60 has tightly fitting painted beads 55 strung thereon with platinum paint 49 on the interior surface 50 and the exterior surface 52 of the ceramic beads 55 forming a good electrical contact between the wire 60 and the drawn tube 63 respectively. This method provides a readily bendable temperature detector cable 61 of indefinite continuous length.

The final steps in the preparation of manufacturing the temperature detector cable 61 are sealing and applying 66 an end fixture thereto. A typical end fixture 70 is indicated in Fig. 12 wherein the ends of the cable 61 are fabricated by utilizing grade A lava 71 which may be machined into bead form similar to the ceramic beads 55 and strung on the ends of the wire 60 within the tube 63. Grade A lava is a generic term used to describe a natural stone that chemically is a hydrous aluminum silicate having a density of .098 pound per cubic inch with a hardness of one to two on the Mohs' scale that is gray and expands slightly on firing. The lava beads 71 are inserted at each end of the cable 61 because they withstand extremely high temperature and protect the ceramic beads 55 when brazing the end fixture 70 to the cable 61 which will be described forthwith.

The sealing plug 72 is brazed to the tube 63 such as by an induction heating process or other suitable means. High temperature insulator 73 slips over the wire 60 and isolates the female contact 74 from the tube 63 and sealing plug 72. Wire 60, female contact 74 and brazing plug 75 are all brazed together. High temperature insulator 76 keeps the female contact 74 centered with respect to the sealing plug 72. High temperature cement 77 seals the opening between sealing plug 72 and female contact sleeve 74. The connector cap 78 forms with the previously mentioned components an inseparable assembly. As the connector cap 78 is threaded on to the connector body 79, the male portion 80 mates with the female contact 74 forming an electrical connection. Simultaneously the collar of connector 78 abuts against the shoulder of sealing plug 72 and forces the tapered face of the sealing plug 72 against the tapered face of the connector body 79 thereby forming a hydraulic seal between the two tapered surfaces. All brazing is preferably done in a hydrogen atmosphere at a dew point of minus 80° F. to minus 100° F. at a temperature of 2100° F.

The connector body 79 may take various forms such as a straight connector, an elbow or a T connection. The connector body 79 may also be designed to connect tube 63 to standard aircraft wiring or to fire resistant cable used in the fire zones. The end fittings 70 serve two purposes: one is to provide a convenient electrical connection and the other is to maintain a hydraulic seal to keep moisture and impurities out of the connections. The end fitting 70 is designed to withstand 2,000° F. without failure or leaking.

Fig. 13 depicts a temperature responsive system utilizing the temperature detector cable previously described which, for purposes of example, will be described using a dielectric sensitive element in the form of a ceramic of lead zirconate. The temperature responsive system is claimed in copending application S.N. 613,136, entitled Temperature Responsive System, filed October 1, 1956. The temperature detector cable or sensing component is indicated at 100 and comprises the conductive tube, dielectric sensitive element and conductive wire which is indicated schematically as lead 101, variable resistance 102 and variable capacitance 103, and lead 104 respectively. As previously explained the sensing component 100 includes a dielectric sensitive element, in this case lead zirconate which is responsive to abnormal and critical temperature conditions. For purposes of this description, the abnormal temperature condition will be referred to as overheat and the critical temperature condition will be referred to as fire. The temperature responsive system comprises an overheat circuit, a fire circuit, a sensing component and a test circuit. The system utilizes paired electrical components including paired magnetic amplifiers in each of the circuits, i.e., the overheat circuit and the fire circuit, providing balanced operation in each portion of the system which will now be described.

A suitable power supply 105, such as 115 volts 400 cycles, is applied to the primary winding 106 of transformer 107 which has secondary windings 108, 109, 110 and 111. Referring now to the overheat circuit, secondary winding 108 feeds a center-tapped autotransformer primary input winding 115 which connects to the other half of the coil, secondary winding 116. The autotransformer output terminals 117 and 118 connect to rectifiers 119 and 120 respectively. The output of rectifier 120 connects to the output of rectifier 119 which in turn is connected to one side of capacitor 121. The other side of capacitor 121 is connected to the autotransformer center tap terminal 122. Two control windings 123 and 124 are connected in series and then connected across capacitor 121. Control winding 123 is wound on a high permeability ferromagnetic core of a magnetic amplifier indicated at A. Control winding 124 is wound on a separate but physically and magnetically identical ferromagnetic core of magnetic amplifier B.

Transformer secondary winding 108 also feeds autotransformer primary input winding 125. This autotransformer is physically and electrically identical to the previously described autotransformer. Center tapped terminals 126 and 122 of each autotransformer have a common connection. Autotransformer winding 125 connects to the other half of the coil, secondary winding 127. The autotransformer terminals 128 and 129 connect to rectifiers 130 and 131 respectively. The output of rectifier 131 is connected to the output of rectifier 130 which in turn is connected to one side of capacitor 132. The other side of capacitor 132 is connected to the autotransformer center tap terminal 126. Two bias windings 133 and 134 are connected in series and then connected across capacitor 132. Winding 134 is wound on the same core as winding 123. Winding 133 is wound on the same core as winding 124. Preferably the cores are supplied as matched pairs from the core manufacturer. All the windings preferably have the same number of turns and are wound with the same gage wire.

Terminal 129 connects to capacitor 140 which in turn is connected in series with capacitor 141, the other side of which is connected to ground. Preferably the capacitance of capacitor 141 is adjustable. Terminal 118 connects to one side of capacitor 142 which in turn is connected to terminal 143. The wire conductor or lead 104 of sensing component 100 also connects to terminal 143. The tube or lead 101 of the sensing component 100 is connected to ground. The dielectric sensitive element of the sensing component 100 is depicted by a variable resistor 102 and a variable capacitor 103 which is the electrical equivalent of the dielectric sensitive element of the preferred embodiment of the invention. It is to be understood that either the resistance characteristic, the capacitance characteristic or a combination of the two as indicated in the preferred embodiment shown in Fig. 13 may be utilized in a temperature responsive system.

The test circuit 144 includes a two pole momentary contact type switch 145, the selecting arm of which also connects to terminal 143. Capacitor 146 is connected to one pole thereof while resistor 147 is connected to the other pole. The other side of capacitor 146 and resistor 147 are connected to ground. If desired, the capacitance and resistance thereof may be adjustable.

Secondary winding 110 of the overheat circuit is center tapped at terminal 150. Output terminal 151 of secondary winding 110 is connected to magnetic amplifier power winding 152. The other side of winding 152 is connected to rectifier 153. The other output terminal 154 of secondary winding 110 is connected to magnetic amplifier power winding 155. The other side of winding 155 is connected to rectifier 156. The output of rectifiers 153 and 156 are connected to terminal 157. Terminal 157 connects to one side of capacitor 158. Terminal 150 connects to the other side of capacitor 158. Relay 159 is connected directly across capacitor 158. In series with the contact arm of relay 159 are suitable alarm devices such as lights 160 and annunciators 161 that are actuated by battery 162 when relay 159 is energized. Power winding 152 is wound on the same core of magnetic amplifier A as control winding 123 and bias winding 134. Power winding 155 is wound on the same core of magnetic amplifier B as control winding 124 and bias winding 133.

Referring now to the fire circuit of the system, terminal 143 is also connected to control winding 165 whose other side is connected to control winding 166 which in turn is connected to a high impedance choke 167. The other side of choke 167 is connected to terminal 168. Terminal 168 is connected to bias winding 169 which is connected to bias winding 170 which in turn is connected to resistor 171 that is connected to ground. Preferably, resistor 171 is adjustable to vary the resistance characteristic thereof. Control winding 165 is wound on a high permeability ferromagnetic core of magnetic amplifier C. Control winding 166 is wound on a separate but physically and magnetically identical ferromagnetic core of magnetic amplifier D. Control winding 165 and bias winding 169 are wound on the same core. Control winding 166 and bias winding 170 are wound on the same core, forming symmetrical magnetic amplifier units C and D as previously described for the overheat magnetic amplifier units A and B.

Secondary winding 109 is center tapped at terminal 175. Output terminal 176 of secondary winding 109 is connected to rectifier 177. The other output terminal 178 of secondary winding 109 is connected to rectifier 179. The output of rectifiers 177 and 179 are connected together to one side of condenser 180 and the same side is connected to terminal 168. Terminal 175 is connected to the other side of condenser 180 which is connected to ground.

Secondary winding 111 has a center tapped terminal 181. The output terminal 182 is connected to magnetic amplifier power winding 183. The other side of winding 183 is connected to rectifier 184. The other output terminal 185 is connected to magnetic amplifier power winding 186. The other side of winding 186 is connected to rectifier 187. The output of rectifiers 184 and 187 are connected to terminal 188. Terminal 188 connects to one side of capacitor 189. Terminal 181 connects to the other side of capacitor 189. Relay 190 is connected directly across capacitor 189. In series with the contact arm of relay 190 are suitable alarm devices such as lights 191 and annunciators 192 that are actuated by battery 193 when the relay 190 is energized. Power winding 183 is wound on the same core of magnetic amplifier C as control winding 165 and bias winding 169. Similarly power winding 186 is wound on the same core of magnetic amplifier D as control winding 166 and bias winding 170 to form symmetrical magnetic amplifiers.

Referring now to the operation of the overheat circuit, the secondary winding 108 of transformer 106 energizes the windings 115 and 125 of the center tapped autotransformer. The autotransformers form two symmetrically full wave rectified capacitor input filter circuits. The outputs of the full wave rectified capacitor input circuits are fed to control windings 123 and 124 and bias windings 133 and 134. The sense of the polarities on the above windings is such that control winding 123 opposes bias winding 134, and control winding 124 opposes bias winding 133. By properly splitting the windings 123 and 134 and windings 124 and 133 between the control circuit and the bias circuit, equal D.C. resistances may be maintained in both circuits thereby minimizing errors in D.C. current levels in the aforesaid windings which could cause error signals to develop.

When the current in the control windings 123 and 124 exceeds the current in the bias windings 133 and 134 by a predetermined positive differential current, for example, 0.15 miliamp. D.C. minimum, the power windings 152 and 155 in the overheat power circuit will saturate permitting full voltage output, for example 26 volts D.C., to appear across the overheat relay 159. The overheat relay 159 is then energized which closes the overheat alarm circuit through the contact arm and actuates the lights 160 and annunciators 161 or other suitable alarm devices.

When the D.C. current in the bias windings 133 and 134 exceeds the D.C. current in the control windings 123 and 124 by a negative differential current of a predetermined amount, for example 0.15 miliamp. D.C. maximum, the overheat power windings 152 and 155 will absorb or drop all of the voltage developed across the center tapped secondary winding 110. When this happens the voltage across the overheat relay 159 will be less than 1 volt D.C., for example, and this drop in voltage will cause the relay 159 to deenergize and interrupt any overheat alarm that had been given. The purpose of using a positive and negative differential current to actuate an alarm and to de-actuate an alarm, respectively, is to achieve an effect of an on or off switching device and reduce the possibility of relay chattering.

One of the unique features of the above described symmetrical capacitor input type full wave filter circuit is that in series with each autotransformer winding is a high impedance device which limits the voltage across the autotransformer winding by acting as a voltage divider network. For the full wave circuit which supplies D.C. current to the control windings 123 and 124, the temperature sensing component 100 represented by a variable resistor 102 and a variable capacitor 103 represents the high impedance device. For the full wave circuit which supplies the D.C. current to the bias windings 133 and 134, the adjustable capacitor 141 is the high impedance device in series with the autotransformer.

Since both autotransformers derive their power from the same secondary winding 108, any line variations of voltage and frequency will effect the bias and control winding circuits in the same manner, and, since the differential current is the criterion for circuit operation, the undesirable effects caused by these variations are nullified. Also to be noted in the performance of the circuits is that rectifiers 119 and 120 and rectifiers 130 and 131 are in series with the full voltage of the autotransformers which is the same as the voltage across secondary winding 108. Because of this, the voltage drops across the diodes subtracts directly from the induced voltage across the autotransformers thereby reducing to a negligible degree the tendency for unequal rectifier forward drops from destroying the symmetry of the full wave capacitor input circuits supplying the D.C. current for the control and bias circuit operation.

The bias D.C. current to windings 133 and 134 may be preset by adjusting capacitor 141 to the value of capacitance which corresponds to the desired abnormal or overheat alarm condition. This alarm condition will occur when the impedance of the sensing component 100 equals or is less than the preset value of capacitor 141. As previously described, the characteristics of the sensing component 100 are predominately capacitive over the abnormal temperature range when using lead zirconate as the dielectric sensitive element. The range of adjustable capacitor 141 is a function of the total sensing component length and the percent of the component exposed to the abnormal temperature.

Condensers 140 and 142 are D.C. blocking capacitors which isolate the overheat circuit which is a rectified and filtered A.C. controlled system from the fire circuit which is a D.C. controlled system. The value for condensers 140 and 142 are equal to preserve the symmetry of both halves of the overheat circuit.

The operation of the fire circuit will now be described. Preferably the fire circuit is provided with a reference D.C. voltage of approximately 27 volts D.C. developed from a full wave capacitor input filter type circuit which is excited from power transformer secondary winding 109. The sense of the polarities of the control windings 165 and 166 and of windings 169 and 170 are such that control winding 165 opposes bias winding 169, and control winding 166 opposes bias winding 170. By properly splitting the windings 166 and 170 and windings 165 and 169 between the control circuit and the bias circuit equal D.C. resistance may be maintained in both circuits. This minimizes errors in the D.C. current levels in these windings which could cause error signals to develop. In this circuit, the impedance of this balanced resistance arrangement is only evident when operating the fire circuit at low values of resistance such as when the value of adjustable resistor 171 approximately equals the D.C. resistance of choke 167. The purpose of choke 167 is to isolate the A.C. overheat circuit from the D.C. fire circuit.

When the current in the control windings 165 and 166 exceeds the current in the bias windings 169 and 170 by a positive differential current, such as 0.15 milliamp. D.C. maximum, the power windings 183 and 186 in the fire power circuit will saturate permitting full output voltage of approximately 26 volts D.C., for example, to appear across the fire relay 190. The fire relay is then actuated which closes the fire circuit indicating visual and/or oral fire alarm by means of lights 191 and/or annunciator 192 respectively. When the D.C. current from the bias windings 169 and 170 exceeds the D.C. current in the control windings 165 and 166 by a negative differential current, such as 0.15 milliamp. D.C. maximum, then the fire power windings 183 and 186 will absorb or drop all the voltage developed by the center tapped secondary winding 111. The voltage across the fire relay 190 will then be less than 1 volt D.C. for example which will cause the relay to be deenergized and discontinue the alarm signal. The same advantages are obtained here as previously described when using positive and negative differential current to give and stop an alarm respectively.

One of the features of this circuit configuration is that in series with the control windings 165 and 166 is the normally high D.C. resistance of the sensing component 100 which permits the D.C. current to flow through the control windings 165 and 166.

The D.C. current in the bias windings 169 and 170 is preset by adjusting resistor 171 to the proper value of resistance which corresponds to the desired fire alarm condition. This alarm condition will occur when the resistance of the sensing component 100 equals or is less than the preset value of adjustable resistor 171. Characteristics of the sensing component 100 are predominately resistive in the critical or fire temperature range when using lead zirconate as the dielectric element as previously explained. The range of resistor 171 is a function of the minimum length of the sensing component 100 which must be exposed to the predetermined alarm temperature conditions.

In order to test the overheat fire alarm system circuitry a test circuit 144 may be utilized. The test circuit 144 consists of capacitor 146 and resistor 147 which acts to shunt the sensing component 100. When the overheat circuit is tested, capacitor 146 shunts the sensing component 100. The value of capacitor 146 is selected such that the total capacitance of the sensing component 100 and capacitor 146 lowers the impedance sufficiently to permit control current to flow and overcome the bias current which has been preset by capacitor 141 thereby activating the overheat alarm relay 159. The value of the test capacitor 146 is selected such that the entire length of the sensing component 100 which has originally been designated for the circuit must be in the circuit to properly activate the overheat alarm circuit. If a portion of the sensing component 100 is missing, the smaller capacitance due to the shorter length of component 100 added to the test capacitor 146 will not be sufficient to reduce the impedance of the combination of component 100 and capacitor 146 to give sufficient current to activate the overheat alarm circuit. Therefore, this arrangement tests both the magnetic amplifier portion of the circuit and also tests the installation of the sensing component 100.

When the fire circuit is tested, resistor 147 shunts the sensing component 100. The shunting resistor 147 reduces the total effective D.C. resistance of the sensing component 100 and causes control current to overcome the bias current which has been preset by adjusting resistor 171. The result is to activate the fire relay 190 and actuate the fire alarm devices thereby checking on the magnetic amplifier and relay portion of the fire circuit.

Thus a system has been described capable of responding to one or more temperature conditions which may be used to provide advance warning of abnormal temperature conditions and subsequently a fire warning. The present system automatically recycles and/or resets itself for subsequent use when the danger condition is past. It also performs reliably and it is not damaged by recycling to temperatures of 2000° F. The system alarms accurately to a specified preset temperature regardless of line voltage or frequency variations. The alarm temperature settings may be changed to meet new operating conditions without changing the cable or the circuits of the system. The present invention may also utilize longer lengths of sensing component over a wider temperature range than prior systems. The sensing component, the amplifier, and the circuit may be accurately and conveniently tested at any time for sensitivity and performance by a simple switching action.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An electric device comprising two conducting electrodes spaced by a ferroelectric body comprising a ceramic of lead zirconate and lead oxide.

2. An electric device comprising two coaxial conducting electrodes spaced by a dielectric body comprising a solid solution of lead zirconate and lead oxide.

3. A bendable temperature responsive cable of considerably greater length than width comprising spaced electrodes and a temperature detector material disposed between and contiguous with said electrodes, said material having a dielectric constant which varies nonlinearly with temperature wherein over a first temperature range the dielectric characteristic is relatively low and substantially constant becoming appreciably higher at a limited second temperature range.

4. A flexible temperature responsive cable of considerably greater length than width comprising spaced electrodes and a temperature detector material disposed between and contiguous with said electrodes, said material having a negative temperature coefficient of resistivity and a dielectric constant which varies nonlinearly with temperature wherein over a first temperature range the value of the dielectric constant is relatively low and substantially constant becoming appreciably higher at a limited second temperature range.

5. A flexible temperature responsive cable of considerably greater length than width comprising spaced electrodes and a temperature detector material disposed between and contiguous with said electrodes, said material having a dielectric constant which varies nonlinearly with temperature whereby over a first temperature range the value is relatively low and substantially constant becoming abruptly higher over a limited second temperature range and a negative temperature coefficient of resistivity that decreases rapidly with increasing temperature to a lower but measurable value over a third temperature range.

6. A temperature responsive cable comprising spaced electrodes and a dielectric material selected from the group consisting of barium titanate, lead hafnate, lead zirconate, rubidium tantalate, sodium niobate, potassium niobate, lithium tantalate, sodium tantalate and lead titanate, contiguous thereto.

7. A temperature responsive cable comprising spaced electrodes and a dielectric material consisting of lead zirconate contiguous thereto.

8. A temperature responsive cable comprising spaced electrodes and a dielectric material consisting of lead zirconate and lead oxide contiguous thereto.

9. An abnormal and critical temperature detector cable having a considerably greater length than width that is responsive to abnormal and critical temperature conditions at any location adjacently along its length comprising a pair of electrical conductive members adjacently disposed along the length of the cable and a ferroelectric temperature detector material separating said members from each other whereby variations in the capacitive characteristics of said cable are indicative of an abnormal temperature and variations in the resistive characteristics of said cable are indicative of a critical temperature.

10. A readily bendable cable-like element of considerably greater length than width for use in the detection of abnormal and critical temperature conditions at any location along its length comprising a bendable tubing element of relatively high electrical conductivity, a wire centrally located therein extending throughout the length of said tube of relatively high electrical conductivity and a ferroelectric material between said wire and said tube providing an electrically conductive path between said wire and said tube whereby the conductivity of said path is indicative of temperature variations.

11. A flexible temperature-responsive cable comprising an exterior tubular sheath, an axially positioned center wire extending lengthwise of said sheath, and a series of metallic coated dielectric ceramic beads strung on said wire, said metallic coating on said beads being contiguous along the length of said cable with said center wire and said sheath.

12. A flexible temperature responsive cable comprising a conductive wire extending along the length of said cable, a plurality of dielectric ceramic beads coaxially strung along the length of said cable on said wire, said beads having a metallic coating on the inside and outside thereof, and a tubular exterior sheath coaxial with said wire extending along the length of said cable and intimately contacting the outside metallic coating on said beads.

13. A flexible temperature responsive cable comprising a conductive center wire extending lengthwise of said cable, a plurality of lead zirconate beads coated on the inside and the outside with platinum, said beads being strung on said wire along the length of said cable whereby the platinum coating on the interior of said beads intimately contact said wire and a conductive exterior tubular member coaxial with said wire along the length of said cable intimately contacting the platinum on the exterior of said beads.

14. A flexible temperature responsive cable as described in claim 13 comprising additional lava beads strung on said wire at the ends of said cable and a fitting coupled to each end of the cable whereby the high temperature brazing required to seal and connect said fitting is confined to the area adjacent to said lava beads.

References Cited in the file of this patent

UNITED STATES PATENTS

| | | |
|---|---|---|
| 1,975,355 | Douglas | Oct. 2, 1934 |
| 1,997,198 | Ogg | Apr. 9, 1935 |
| 2,407,750 | Smith | Sept. 17, 1946 |
| 2,455,355 | Combs | Dec. 7, 1948 |
| 2,566,335 | Joerren | Sept. 4, 1951 |
| 2,629,166 | Marsten | Feb. 24, 1953 |
| 2,731,532 | Mathisen | Jan. 17, 1956 |
| 2,778,887 | Bradley | Jan. 22, 1957 |